Dec. 1, 1959 E. A. MARCEC 2,914,824
HOT TOP
Filed Jan. 21, 1955
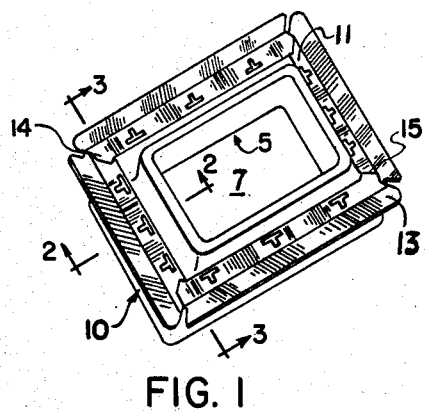
FIG. 1
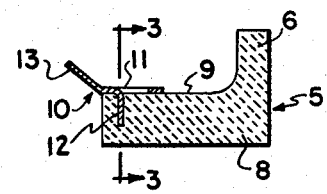
FIG. 2
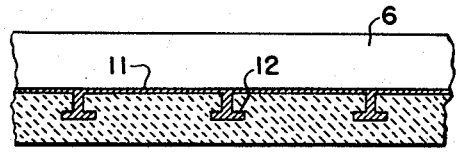
FIG. 3
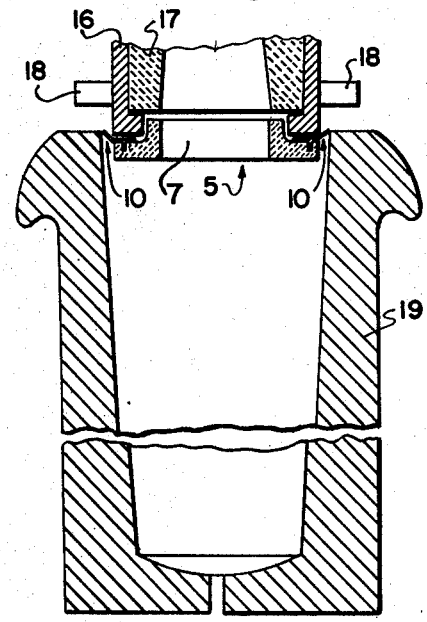
FIG. 4
FIG. 7
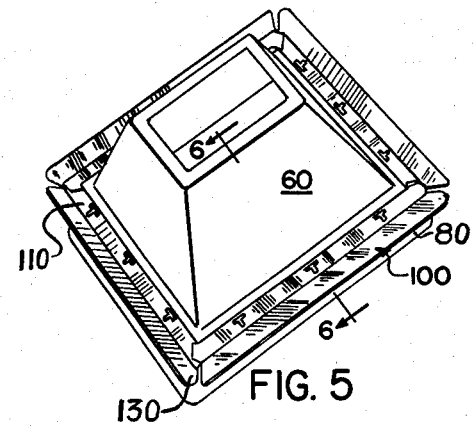
FIG. 5
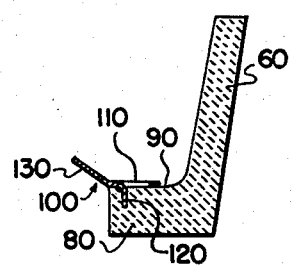
FIG. 6
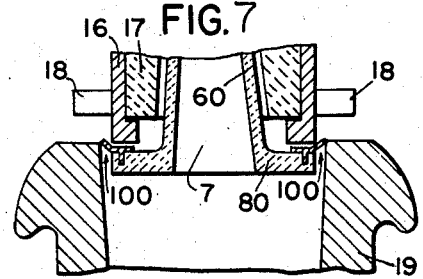
*INVENTOR*
ERVIN A. MARCEC
BY
ATTORNEY

United States Patent Office 2,914,824
Patented Dec. 1, 1959

2,914,824

HOT TOP

Ervin A. Marcec, Chicago, Ill., assignor of one-half to Frank H. Ellenbaum, Oak Park, Ill.

Application January 21, 1955, Serial No. 483,322

7 Claims. (Cl. 22—147)

This invention is concerned with the art of molding ingots and more specifically with improvements in bottom rings and liner inserts provided with integral wiper strips for positioning between an ingot mold and hot top and a method of manufacturing same.

Currently in molding ingots, two methods are principally practiced. The first and older practice utilizes individual wiper strips which are usually strips of thin gauge sheet metal releasably clamped in sections directly to the hot top. As the hot top is lowered into the mold opening, the wiper strips flex and form a seal between the hot top and mold. The more recent practice is to releasably clamp wiper strips in sections to the various sides of a refractory bottom ring which in turn is suspended from the hot top and then lowered onto the mold.

Either is subject to the disadvantage that the wiper strips or sections must be individually inserted and clamped to the respective sides of either the hot top itself or to the bottom ring, depending on the practice followed, entailing both time and labor cost.

In accordance with the present invention there is provided a composite bottom ring and wiper arrangement and a composite hot top liner insert and wiper arrangement which overcome entirely the disadvantages noted and since both wiper with refractory ring or insert are expendable with each heat, the advantage of employing one of the composite devices of this invention is manifest. The provision of such composite ring-wiper or insert-wiper devices constitutes the principal object of this invention.

Additional features and advantages will become more apparent as the following description proceeds taken in conjunction with the accompanying drawings wherein:

Fig. 1 is a perspective view of the composite refractory ring and wiper arrangement.

Fig. 2 is a sectional view on line 2—2 of Fig. 1.

Fig. 3 is a partial sectional view on line 3—3 of Fig. 1.

Fig. 4 is a sectional view illustrating the composite wiper-ring in place between a hot top and an ingot mold.

Fig. 5 is a perspective view of a composite refractory hot top insert and wiper arrangement.

Fig. 6 is a sectional view on line 6—6 of Fig. 5, and

Fig. 7 is a sectional view illustrating the composite refractory hot top insert and wiper arrangement in place between a hot top and an ingot mold.

Referring now more particularly to the drawings, numeral 5 designates a refractory bottom ring shaped in accordance with conventional practice and having a rim 6 defining a central opening 7 and extending laterally from the rim, a lip like base 8. During the formation of the refractory ring 5 and while it is in the plastic state before it is fired, there is preferably positioned on the upper side 9 of the base lip 8 of the ring and about its outer periphery, a unitary wiper structure 10. The wiper structure 10 is formed of thin gauge sheet metal and is provided with an inner collar 11 having a plurality of tabs or anchor members 12 depending therefrom. These tabs or anchor members 12 may be of any configuration but are preferably of T shape, punched out and bent downward from the collar portion 11 but depending therefrom by maintaining the leg of the T unsevered. The collar 11 of the wiper is positioned flat on the upper outer part of the base lip 8 (see Fig. 2) and the tabs or anchor members 12 are embedded into the base lip portion 8. After the ring has been fired, the tabs 12 are firmly anchored in the ring 5. The wiper is further provided with an integral outer flange 13 extending outwardly and preferably at a slight angle upward from the inner collar portion 11 which overlies the outer top portion of the ring base 9. The flange 13 is adapted to wipe against the inner wall of the mold in otherwise conventional manner.

The wiper 10 may be formed in one piece as by stamping from thin gauge sheet metal, but to minimize waste it is preferably formed in sections as shown in Fig. 1 with overlapping end tabs 14 for the collar portion 11 which are then secured together as by welding at 15. This lends rigidity to the inner collar portion 11 without affecting the flexibility of the inclined flange portions 13 which greatly facilitates and simplifies the procedure in fabricating the collar onto the ring and the embedding of the tabs into the ring while the latter is in the plastic state before it is fired.

It is contemplated as being within the scope of the invention, however, that the wiper may be separately placed in sections and integrated into the ring or insert described below, while in the plastic state but this would multiply the fabricating effort considerably and the former arrangement of first welding the corners (spot welding has been found sufficient) is by far the most economical and advantageous. Prefabricating the wiper strip as by spot welding the corners of the stamped sections also results in the advantage that constant preselected overall dimensions can be readily maintained.

In Fig. 4, there is illustrated in section the manner in which the composite wiper-ring 5, 10 of this invention would appear in position between an ingot mold 19 and a hot top shown only in part and including its casing 16, refractory lining 17 and supporting trunnions 18. In the interest of clarity the conventional clips by which the ring 5 is supported from the hot top are omitted in the illustration.

In Figs. 5, 6 and 7 there is illustrated a modification of the invention in that unitary wiper structure 100 which is in all respects the same as the wiper structure 10 described above, is embedded in a base like lip 80 of a refractory insert liner, the lip extending laterally from a central four sided truncated cone shaped walled portion 60 defining a central opening widening downwardly to the base lip 80. The wiper as was the case with the bottom ring described above, is placed on the upper side 90 of the base lip 80 about its outer periphery. Tabs or anchors 120 depending from an inner collar portion 110 of the wiper are embedded in the refractory material after it has been molded to the desired shape and before it is fired. An integral outer flange 130 is provided extending upwardly and outwardly from the collar 110 and is adapted to wipe against the inner wall of the mold to seal off the space between the hot top and the mold in conventional manner.

It will be apparent that when a composite liner-wiper insert as described is employed, the use of a bottom ring is unnecessary as the lower lip portion 80 acts as a shield for the hot top casing 16 in the same manner as would a bottom ring. The liner insert is supported from the hot top by clamps not shown in the same manner as bottom rings are conventionally supported. The truncated walls 60 are of course, dimensioned to closely fit within the refractory lining of the hot top and provide a significant advantage in that it eliminates the necessity of having the refractory lining of the hot top further lined with mud before each heat is poured. It will be recognized that this results both in a saving of the cost of the mud material as well as a considerable saving in time.

Additional advantages obtained from employment of a liner-wiper insert according to this invention reside in reduction of the volume of molten metal necessary in the hot top when the liner is combined with the use of insulating bricks in the hot top casing because the insulating characteristics permit a smaller volume of metal to be maintained molten longer; a reduction in the possibility of "wet" hot tops causing metal boil; and increased life of brick linings in the hot top casing since the latter are subjected to mechanical abrasion only in the insertion and removal of the liner inserts.

It will be understood that since a hot top is seldom completely filled with molten metal, the truncated wall portion of the insert need not extend up the full height of the hot top, but only as far as the molten metal level is contemplated to reach. It will also be appreciated that both the composite ring-wiper and wiper-liner inserts can be fabricated at any location in any desired geometric shape and shipped either intact or in the case of the ring-wipers, in mating sections, preferably not more than two, and in the case of the liners, in several sections, for ready assembly and use.

Certain other modifications and revisions will be suggested hereby to those skilled in the art, and all of these that do not depart from the spirit of the invention are included within its scope, best defined in the appended claims.

I claim:

1. A composite liner insert for a hot top comprising a central upstanding hollow truncated cone of refractory material adapted to closely fit within the lining of the hot top, an integral lip of refractory material extending laterally from the bottom of said cone, and a flexible metal wiper at least partially embedded and anchored in the refractory material of said lip and extending outwardly beyond the periphery thereof for sealing engagement with the inner walls of a mold.

2. A composite bottom ring for a hot top comprising a ring of refractory material provided with an outwardly extending peripheral lip, a flexible sheet metal wiper comprising an inner collar portion overlaying said lip and a portion extending outwardly from said collar portion at a slight angle thereto beyond the periphery of the lip for sealing engagement with the inner walls of a mold, a plurality of spaced lugs depending from the underside of said collar portion of the wiper, the lower ends of which lugs are of greater width than the upper ends, all of said lugs extending into the lip of refractory material and being firmly anchored therein.

3. A composite bottom ring for a hot top comprising a ring of refractory material provided with an outwardly extending peripheral lip, a flexible sheet metal wiper comprising an inner collar portion overlaying said lip and an outer portion extending outwardly from said inner portion at a slight angle thereto beyond the periphery of the lip for sealing engagement with the inner walls of a mold, said inner collar portion of sheet metal having a plurality of integrally formed downwardly turned lugs extending into the lip of said ring and being firmly and solidly embedded therein, said depending lugs having lower portions of substantially greater width than the upper end portions thereof for locking said wiper in place.

4. In a hot top, a casing provided with a refractory lining, and a refractory member having a wiper strip comprising an inner collar and a flexible portion extending outwardly from said collar beyond the outer periphery of the refractory member, said collar extending at least in part within said refractory member, the portion of the collar extending into the refractory member having laterally extending portions integrally bonded to said refractory member.

5. In a hot top, a casing provided with a refractory lining, and a refractory member having a wiper strip comprising an inner collar and a flexible portion extending outwardly from said collar beyond the outer periphery of the refractory member, said collar provided with anchoring means extending within said refractory member for positively preventing movement of said collar portion with respect to said refractory member, said anchoring means having transversely extending surface portions integrally bonded to said refractory member.

6. A composite bottom ring for a hot top comprising a refractory member defining a central opening and having a plurality of lateral sides spaced from said opening, and a wiper strip comprising an inner collar and a flexible portion extending outwardly from said collar beyond the outer periphery of the refractory member defined by said lateral sides, said collar being provided with anchoring means connecting said collar to said refractory member and extending into said refractory member, said anchoring means adapted to positively prevent movement of said collar portion with respect to said refractory member and having transversely extending surfaces within said refractory member.

7. Method of manufacturing a composite refractory-metal member and wiper for a hot top comprising the steps of: molding refractory material to define a central opening, a lip extending laterally from said opening and provided with a plurality of lateral sides, cutting a flexible metal wiper in size slightly larger than the outer periphery of the refractory material defined by said lateral sides, punching out in part at least inner portions of said wiper, inserting into the molded refractory member the punched-out portions at least of the wiper strip in such manner that a flexible portion of the wiper extends outwardly beyond the outer periphery of said refractory member, and curing the refractory member with the wiper portions thus inserted to connect and integrally bond the inserted portions of the wiper within and to said refractory member.

References Cited in the file of this patent

UNITED STATES PATENTS

| | | |
|---|---|---|
| 2,030,199 | Charman | Feb. 11, 1936 |
| 2,258,483 | Charman | Oct. 7, 1941 |
| 2,572,452 | Daley | Oct. 23, 1951 |
| 2,574,815 | Charman | Nov. 13, 1951 |
| 2,741,816 | White | Apr. 17, 1956 |